United States Patent
Rodrigues et al.

(10) Patent No.: US 11,819,796 B2
(45) Date of Patent: Nov. 21, 2023

(54) METHOD FOR PRODUCING OXYGEN VIA O2 VSA, MINIMIZING VALVE OPENINGS AND CLOSINGS

(71) Applicant: L'Air Liquide, Société Anonyme pour l'Etude et l'Exploitation des Procédés Georges Claude, Paris (FR)

(72) Inventors: Guillaume Rodrigues, Le Plessis Trevise (FR); François Darrigade, Paris (FR); Patrick Le Bot, Vincennes (FR); Pierre Petit, Paris (FR); Stéphane Pusiol, Paris (FR); Maxime Perez, Bussiares (FR)

(73) Assignee: L'Air Liquide, Société Anonyme pour l'Etude et l'Exploitation des Procédés Georges Claude, Paris (FR)

(*) Notice: Subject to any disclaimer, the term of this patent is extended or adjusted under 35 U.S.C. 154(b) by 583 days.

(21) Appl. No.: 16/976,042

(22) PCT Filed: Feb. 25, 2019

(86) PCT No.: PCT/FR2019/050424
§ 371 (c)(1),
(2) Date: Aug. 26, 2020

(87) PCT Pub. No.: WO2019/166725
PCT Pub. Date: Sep. 6, 2019

(65) Prior Publication Data
US 2021/0039039 A1 Feb. 11, 2021

(30) Foreign Application Priority Data
Mar. 1, 2018 (FR) ........................ 1851795

(51) Int. Cl.
*B01D 53/047* (2006.01)
*B01D 53/053* (2006.01)

(52) U.S. Cl.
CPC ........ *B01D 53/0476* (2013.01); *B01D 53/053* (2013.01); *B01D 2253/108* (2013.01);
(Continued)

(58) Field of Classification Search
CPC .. B01D 53/04; B01D 53/0476; B01D 53/047; B01D 53/053; B01D 2253/108;
(Continued)

(56) References Cited

U.S. PATENT DOCUMENTS 6,030,435 A 2/2000 Monereau et al.
6,090,185 A 7/2000 Monereau et al.
(Continued)

FOREIGN PATENT DOCUMENTS

EP 0 458 350 11/1991
FR 2 766 384 1/1999
(Continued)

OTHER PUBLICATIONS

International Search Report for corresponding PCT/FR2019/050424, dated Jun. 24, 2019.

*Primary Examiner* — Frank M Lawrence, Jr.
(74) *Attorney, Agent, or Firm* — Elwood L. Haynes

(57) ABSTRACT

A method for producing oxygen from air using vacuum swing adsorption by means of a unit including at least two adsorbers each following, with an offset a pressure cycle, with a decompression step including at least a co-current first decompression sub-step for the partial balancing of pressure with the other adsorber which is performing counter-current recompression by means of a balancing valve, and, at least for one cycle out of three, a dead time sub-step which succeeds the first decompression sub-step, the method including a pressure of X bar at the end of the first decompression sub-step for the cycles that do not have a dead time sub-step, and a pressure of X bar at the end of the dead time
(Continued)

sub-step, opening the balancing valve identically during the first decompression sub-step and the dead time sub-step, for the cycles that do have a dead time sub-step.

7 Claims, 4 Drawing Sheets

(52) U.S. Cl.
CPC .... *B01D 2256/12* (2013.01); *B01D 2257/102* (2013.01); *B01D 2259/402* (2013.01); *B01D 2259/40015* (2013.01); *B01D 2259/40022* (2013.01); *B01D 2259/40032* (2013.01); *B01D 2259/40037* (2013.01); *B01D 2259/40049* (2013.01); *B01D 2259/40052* (2013.01); *B01D 2259/40075* (2013.01)

(58) Field of Classification Search
CPC .......... B01D 2256/12; B01D 2257/102; B01D 2259/40015; B01D 2259/40022; B01D 2259/40032; B01D 2259/40037; B01D 2259/40049; B01D 2259/40052; B01D 2259/40075; B01D 2259/402
USPC .............................. 95/96–98, 102, 103, 130
See application file for complete search history.

(56) References Cited

U.S. PATENT DOCUMENTS

| | | | |
|---|---|---|---|
| 6,238,458 B1 | 5/2001 | Monereau | |
| 6,296,688 B1* | 10/2001 | Cheng ................. | B01J 20/0292 |
| | | | 95/902 |
| 2014/0076164 A1 | 3/2014 | Monereau et al. | |
| 2021/0346837 A1* | 11/2021 | Ritter ................. | B01D 53/0407 |
| 2022/0233995 A1* | 7/2022 | Monereau ............... | C01B 32/40 |

FOREIGN PATENT DOCUMENTS

| | | |
|---|---|---|
| FR | 2 772 637 | 6/1999 |
| FR | 2 783 723 | 3/2000 |
| FR | 2 975 017 | 11/2012 |

\* cited by examiner

METHOD FOR PRODUCING OXYGEN VIA O2 VSA, MINIMIZING VALVE OPENINGS AND CLOSINGS

CROSS REFERENCE TO RELATED APPLICATIONS

This application is a 371 of International Application No. PCT/FR2019/050424, filed Feb. 25, 2019, which claims priority to French Patent Application No. 1851795, filed Mar. 1, 2018, the entire contents of which are incorporated herein by reference.

BACKGROUND

The present invention relates to a method for producing oxygen from a stream of air by vacuum swing adsorption (VSA).

O2 VSA (Vacuum Swing Adsorption) units are units for separating gases from the air by a pressure swing adsorption process in which the adsorption is substantially carried out at atmospheric pressure, referred to as high pressure, that is to say between 1 bara and 1.5 bar, and the desorption is carried out at a pressure below atmospheric pressure, typically between 0.3 and 0.5 bar. The production of gaseous oxygen achieves a purity of around 90% to 93% and the production range of this type of apparatus varies from 30 t/d to 200 t/d. These processes find applications in fields such as water purification, glass manufacture, the treatment of paper pulps, etc.

A compressor (or a blower) and a vacuum pump are often used to achieve the pressures of the cycle.

VSA cycles comprise at least the following steps: production, decompression, purge, recompression. VSA units use selective zeolites that make it possible to obtain a product with a purity typically of around 90% or more.

The units operate generally with a total cycle time greater than 30 seconds and employ one to three adsorbers.

This cycle time duration is subdivided into a number of sub steps generally higher than 8, in order to achieve both good productivity and low specific energy. As a result, the valves, generally of the butterfly valve type, of these units are made to open and close numerous times (several million times per year), where the higher the number of cycles, the shorter will be the maintenance intervals required and the higher will be the operating cost. Furthermore, the number of cycles may lead to changes to the settings of these valves, impairing the performance of the unit, or, more critically, may lead to failure of these valves, requiring liquid to be vaporized in order to ensure the continuity of supply to the customers, at an appreciable additional cost.

FIG. 2 depicts a cycle involving 2 adsorbers, 1 production buffer volume, a blower, a vacuum pump, and comprising 14 sub steps.

Each adsorber has 2 sides, the first being the supply or pumping side and the second being the oxygen production side.

At the same time adsorber 1 is undergoing steps 1 to 7, adsorber 2 is undergoing steps 8 to 14.

Step 1 (Production 1): The blower supplies the first adsorber with air, nitrogen is selectively adsorbed and an oxygen-rich stream is sent to the production volume.

Step 2 (Production 2): The blower supplies the first adsorber with air, nitrogen is selectively adsorbed and an oxygen-rich stream is sent to the production volume.

Part of the oxygen flow produced is tapped directly from the outlet of the first adsorber and used in a later step (step 9).

Step 3 (Equalization 1): the blower no longer supplies the first adsorber. This is therefore closed on the supply side and the outlet is connected to the second adsorber so that some of the oxygen-rich and non-adsorbed gas contained in the adsorber is reused to refill and elute the second adsorber (step 10).

Step 4 (Reduced Run): the first and second adsorbers are closed and the machines operate on a minimal pressure differential. This step has a zero duration when the unit is operating at its nominal output (FIG. 1).

Step 5 (Equalization 2+purge): the first adsorber is connected to the vacuum pump on the supply side, making it possible to desorb some of the nitrogen contained in the adsorbent, and its outlet is connected to the second adsorber so that some of the gas contained in the adsorber in the nonadsorbed phase is reused to refill the cylinder 2 (step 12).

Step 6 (Purge 1): the first adsorber is closed on the side of the oxygen production side and the supply side is connected to the vacuum pump which then extracts the nitrogen contained in the adsorbent.

Step 7 (Purge 2): the first adsorber is closed on the side of the oxygen production side and the supply side is connected to the vacuum pump which then extracts the nitrogen contained in the adsorbent.

Step 8 (Purge 3): the second adsorber is closed on the side of the oxygen production side and the supply side is connected to the vacuum pump which then extracts the nitrogen contained in the adsorbent.

Step 9 (Elution): the second adsorber is supplied on the oxygen side with the gas tapped from the outlet of the first adsorber during step 2, making it possible to push back the adsorbed nitrogen front. On the supply side, the vacuum pump extracts the nitrogen contained in the adsorbent.

Step 10 (Upper balancing 2+purge): the second adsorber is supplied on the oxygen side with the gas tapped from the outlet of the first adsorber during step 3, making it possible both to recover oxygen which would otherwise be lost and to push back the nitrogen front, while the supply side is connected to the vacuum pump which vacuum extracts the nitrogen contained in the adsorbent.

Step 11 (Reduced Run): the 2 adsorbers are closed and the machines operate on a minimal pressure differential. This step has a zero duration when the unit is operating at its nominal output.

Step 12 (Upper balancing 1): the second adsorber is closed on the supply side. It refills via the oxygen side thanks to the gas contained in the first adsorber, and coming from step 5, making it possible both to recover oxygen which would otherwise be lost and to push back the nitrogen front.

Step 13 (O2+recompression air): the blower is used to refill the second adsorber via the supply side and at the same time oxygen is tapped from the production buffer reservoir to refill the adsorber from the top, allowing the nitrogen front to be pushed back.

Step 14 (Final recompression): the blower is used to refill the second adsorber via the supply side. The adsorber is closed on the oxygen side.

Note that balancing valve KV105 remains open, at degrees of opening that may be variable, for 3 consecutive substeps.

When the customer demand for O2 drops, production needs to be adjusted.

The first level of adjustment is to reduce the degree of opening of the production valve, and this has the effect of increasing the purity of the oxygen. The profitability of the unit is thus downgraded. Furthermore, upwards of a certain level of purity, the purity may degrade sharply because of the argon enrichment phenomenon. For these 2 reasons, this solution is limited to modest reductions in the production output.

As an alternative, if it is possible to reduce the quantity of supply and purge gas, production can be adjusted by altering the cycle time. In an O2 VSA, this type of operation is rendered possible for example by installing variable-speed drives on the supply and pumping machines.

Nevertheless, in most cases, for reasons associated with cost, O2 VSA facilities are not equipped with systems for adjusting the capabilities of the machines. As a result, the output produced per cycle is fixed and it is necessary to reduce the number of cycles per unit of time in order to reduce production. This is achieved by isolating the adsorbers at a clearly defined moment in the cycle (generally at the moment at which the vacuum pump switches over from one adsorber to the other), and by running the compressor and the vacuum pump with a minimal pressure differential (for example injecting the gas delivered by the machines into their intake side) so as to minimize their energy consumption. This step of pausing the cycle is known as dead time and is associated with activation of the "Reduced Run" (RR) mode.

This mode is not triggered immediately when the demand for oxygen is reduced but is triggered when the percentage drop exceeds a certain level so that it is thus possible to have a dead-time duration that is compatible with the valve opening/closing times.

Conventionally, RR mode is activated at the end of substep 3, minimizing as far as possible the operations of the air and vacuum valves. By contrast, it is necessary to close the balancing valve at the end of this substep 3 and then reopen it at the end of the dead time (RR step).

FIG. 2 depicts a conventional O2 VSA cycle in which the RR mode (dead time) is activated at the end of substep 3. It is necessary to close the balancing valve KV105 at the end of substep 3 and then reopen it at the end of the dead time.

On that basis, one problem that arises is that of providing an improved method for producing oxygen by O2 VSA that minimizes the openings and closings of valves.

SUMMARY

One solution of the present invention is a method for producing oxygen from air using vacuum swing adsorption (VSA) by means of a unit comprising at least two adsorbers each following, with an offset, a pressure cycle comprising the steps of production, decompression, purge and recompression, with the decompression step comprising at least a co-current first decompression substep for the partial balancing of pressure with the other adsorber which is performing countercurrent recompression by means of a balancing valve and, at least for one cycle out of three, a dead-time substep which succeeds the first decompression substep, with:

for the cycles that do not have a dead time substep, a pressure of X bar at the end of the first decompression substep, for the cycles that do have a dead time substep, a pressure of X bar at the end of the dead time substep and identical opening of the balancing valve during the first decompression substep and the dead time substep.

What is meant by dead time is a duration for which the two adsorbers are closed. In order to minimize the consumption of the other machines of the facility over the course of this duration, these machines are generally run in recirculation mode (where the intake and delivery of the machines are placed in communication with one another) or discharge the intake air to the atmosphere.

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

DETAILED DESCRIPTION OF PREFERRED EMBODIMENTS

Figure 3:
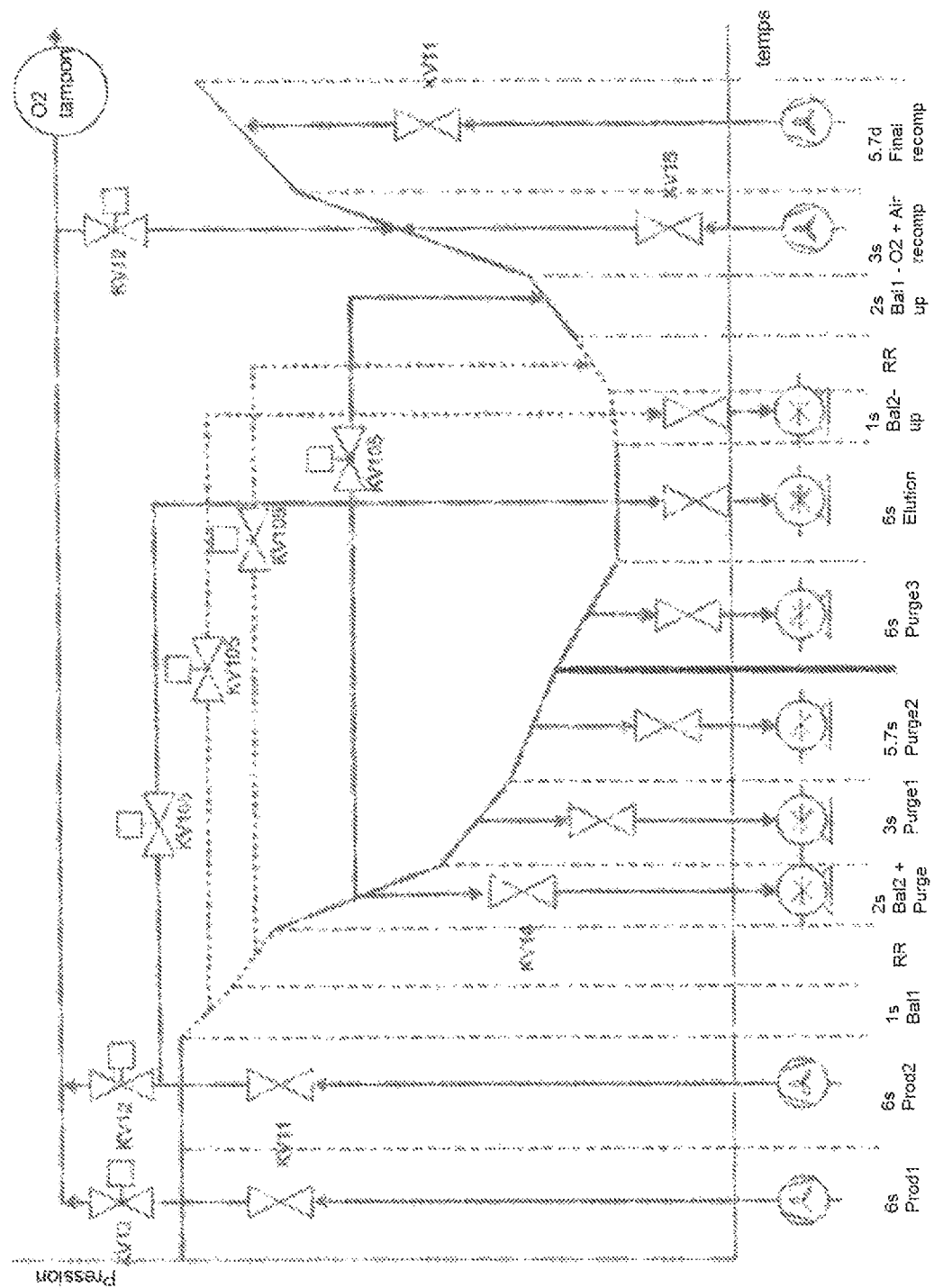
FIG. 3 illustrates a VSA cycle in accordance with one embodiment of the present invention.

FIG. 3 depicts an O2 VSA cycle according to the invention.

Figure 1:
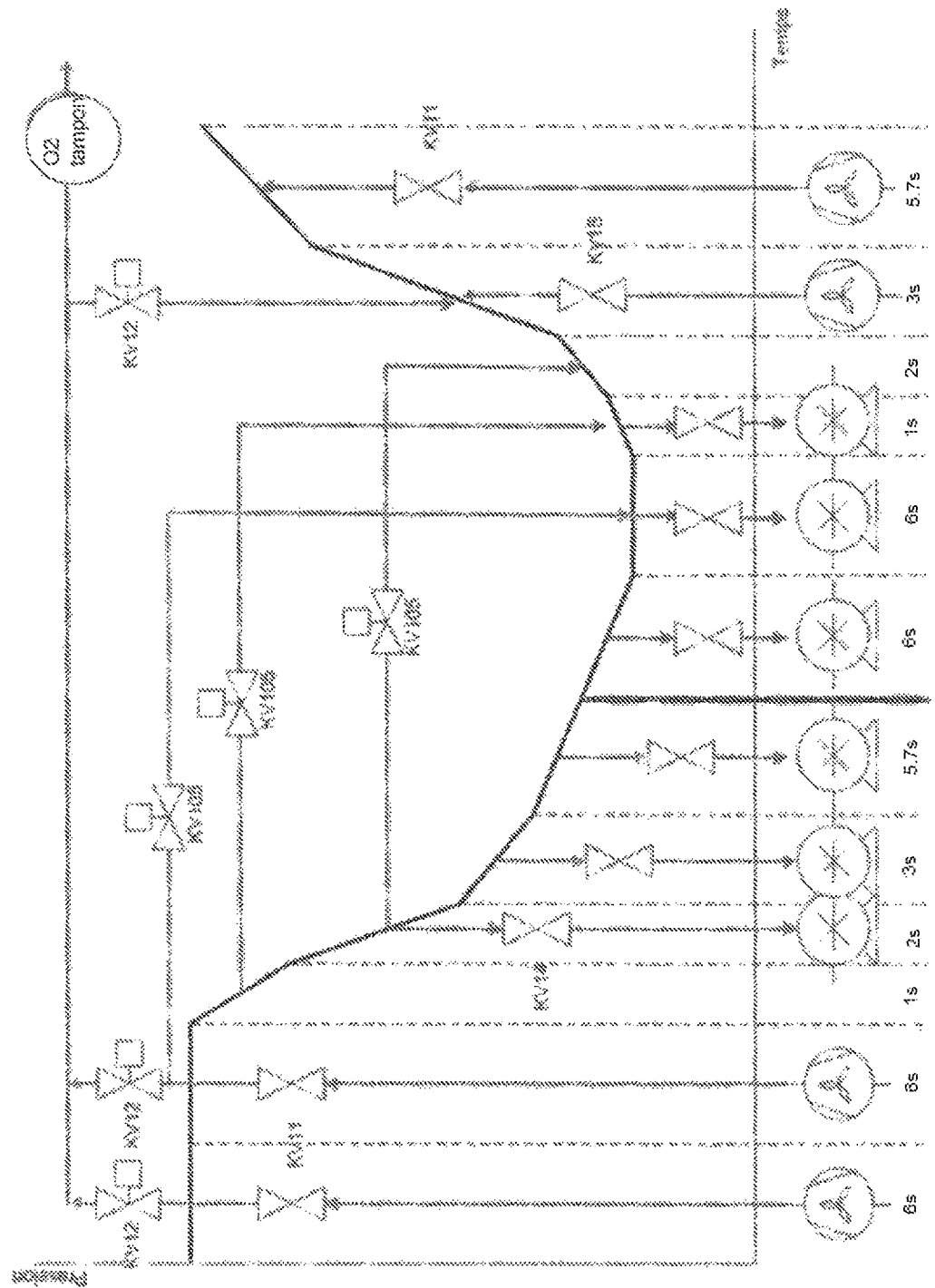
FIG. 1 illustrates one aspect of a VSA cycle as known in the art.
Figure 2:
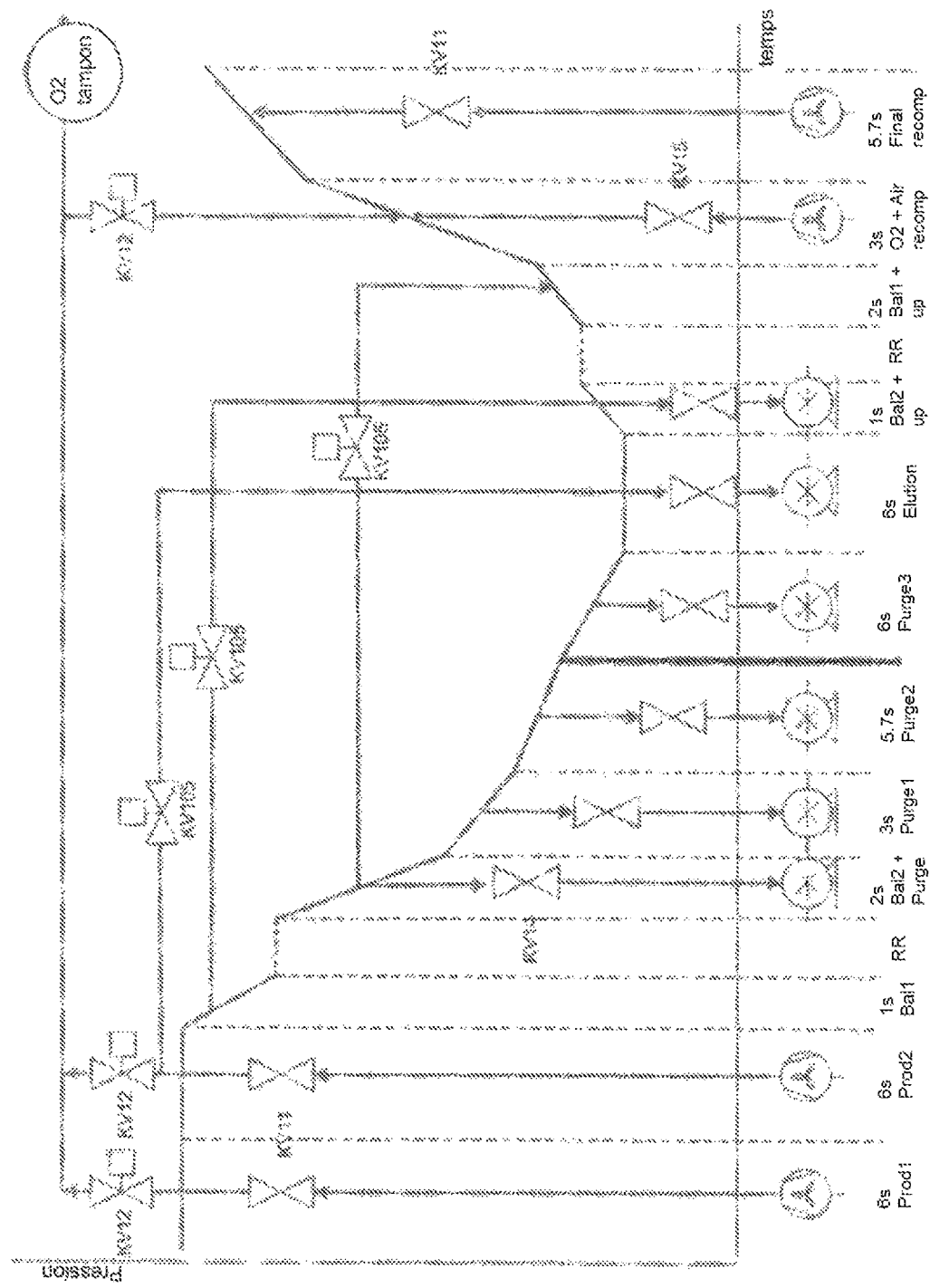
FIG. 2 illustrates another aspect of a VSA cycle as known in the art

The opening of the balancing valve is reduced when the RR mode (dead time substep) is activated so that the final pressure at the end of the dead time is the same as that at the end of substep 3 in normal operating mode, namely in the case of a cycle with the balancing valve closed during the dead time substep (see FIG. 2). As a result, the balancing valve does not reclose between the balancing substeps, thus making the unit more reliable and limiting drops in performance or difficulties with settings of the cycle which are associated with the valve opening times of durations comparable with that of the steps. Of course, implementation of this solution entails a suitable control strategy for controlling the opening of the balancing valve, namely slaving the opening of the balancing valve to make it dependent on the production output of the unit.

Mirroring that which occurs during steps 3 and 4, the pressure at the end of the dead time step 11 when the RR mode is activated will be the same as that at the end of step 10 for cycles that do not have the dead time step.

Activation of the RR mode involves adding the dead time to each cycle and, for reasons concerned with the minimum duration of the dead time, activation of the RR mode occurs only for a sufficient reduction in O2 production (prior to that, the production output simply leads to an increase in the O2 purity). In order to trigger the RR mode for smaller reductions in production output, the addition of the dead time is performed not every cycle but for 1 cycle in every N cycles (N=1 to 5) The introduction of this solution, coupled with the idea put forward previously, significantly reduces the disadvantages associated with the RR mode.

As the case may be, the method according to the invention can exhibit one or more of the features below:

during the cycles that do not have a dead time substep, the decompression rate is comprised between 300-100 mbar/s.

during the cycles that do have a dead time substep, the decompression rate is comprised between 150 and 5 mbar/s.

the decompression step comprises a dead time substep for at least one cycle in two.

the two adsorbers follow the pressure cycle with an offset of half a cycle time.

the balancing valve used during the first decompression substep and the dead time substep is a valve of the butterfly valve or globe valve type.

the opening of the balancing valve is regulated according to the desired oxygen production output, and therefore according to the ensuing dead-time duration.

Figure 4:
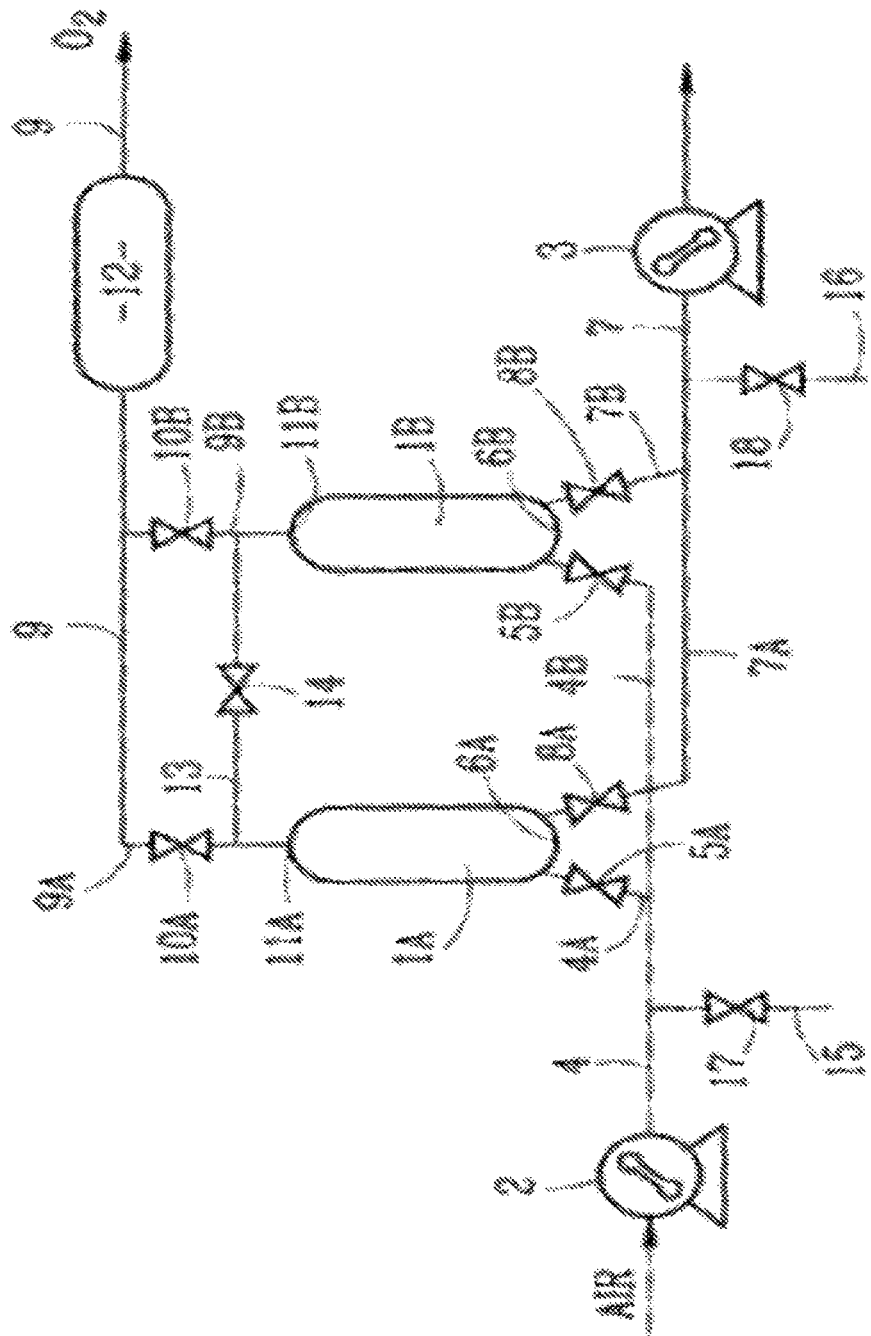
FIG. 4 illustrates a VSA cycle in accordance with one embodiment of the present invention.

FIG. 4 schematically depicts a V(P)SA installation to which the invention applies.

In the example depicted, the installation essentially comprises two adsorbers 1A and 1B, a compressor or a blower 2, a vacuum pump 3 and a collection of pipes and valves, as well as control and regulation means which have not been depicted, suitable for implementing the cycle described later. The compressor and the pump are positive-displacement machines of the "Roots" type and permanently rotate at constant speed.

FIG. 4 schematically indicates:

- an atmospheric-air supply pipe 4 which begins at the delivery side of the compressor 2 and splits into two branches 4A, 4B equipped with respective supply valves 5A, 5B and connected respectively to the lower inlets 6A, 6B of the adsorbers;
- a purge/elution pipe 7 which splits into two branches 7A, 7B equipped with purge/elution valves 8A, 8B and beginning respectively at the inlets 6A, 6B of the adsorbers;
- a production pipe 9 which splits into two branches 9A, 9B equipped with production valves 10A, 10B and beginning respectively at the upper outlets 11A, 11B of the adsorbers. A buffer volume 12 is mounted in the pipe 9; and
- a balancing/elution pipe 13 which directly connects together the outlets 11A and 11B and which is equipped with a balancing/elution valve 14.

The intake side of the compressor 2 and the delivery side of the vacuum pump 3 are in permanent communication with the surrounding atmosphere. The adsorbers 1A to 1B each contain at least one bed of an adsorbent designed to selectively adsorb the nitrogen from the air, and which in this example is a molecular sieve of the CaA type or a lithium-exchanged zeolite. In addition, bypasses 15 and 16, equipped with a respective valve 17, 18, are respectively tapped off the pipes 4 and 7 just downstream of the compressor 2 and just upstream of the pump 3. These bypasses, which are notably both used during the dead time step corresponding to the Reduced Run mode, open onto the surrounding atmosphere.

The invention consists in limiting the openings/closings of the balancing valve when the Reduced Run mode (dead time) of an O2 VSA is active. Beyond a certain percentage reduction in production, the number of cycles per unit of time is reduced via a step referred to as a dead time step in which the machines are in recirculation mode and therefore disconnected from the adsorbers. In certain cycles, activation of this dead time imposes an opening/closing of the balancing valve in a time that may be very short, leading to fatigue of this valve and difficulties with mastering the performance of the method. The solution according to the invention therefore makes it possible to improve the reliability of the units or reduce the cost or frequency of maintenance thereof, by avoiding fully closing this valve and then opening it.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A method for producing oxygen from air using vacuum swing adsorption by means of a unit comprising at least a first adsorber and a second adsorber each following, with an offset
    a pressure cycle comprising,
    a decompression step, comprising a decompression rate,
    a purge step, and
    a recompression step,
    with the decompression step of the first adsorber comprising at least a co-current first decompression sub-step for the partial balancing of pressure with the second adsorber which is performing counter-current recompression by means of a balancing valve, and,
    at least for one cycle out of three, a dead time sub-step which succeeds the first decompression sub-step, and further comprising:
        providing a first pressure at the end of the first decompression sub-step for the cycles that do not have a dead time sub-step, and
        providing the first pressure at the end of the dead time sub-step, opening the balancing valve identically during the first decompression sub-step and the dead time sub-step, for the cycles that do have a dead time sub-step.

2. The method as claimed in claim 1, wherein during the cycles that do not have a dead time sub-step, the decompression rate is between 300-100 mbar/s.

3. The method as claimed in claim 1, wherein during the cycles that do have a dead time sub-step, the decompression rate is between 150 and 5 mbar/s.

4. The method as claimed in claim 1, wherein the decompression step comprises a dead time substep for at least one cycle in two.

5. The method as claimed in claim 1, wherein the at least first adsorber and second adsorber follow the pressure cycle with an offset of half a cycle time.

6. The method as claimed in claim 1, wherein the balancing valve used during the first decompression sub-step and the dead time sub-step is a valve of the butterfly valve or globe valve type.

7. The method as claimed in claim 1, wherein the opening of the balancing valve is regulated according to the desired oxygen production output.

* * * * *